Mar. 3, 1925.
H. S. WATERMAN
ADJUSTABLE MANDREL
Filed Feb. 20, 1923
1,528,353
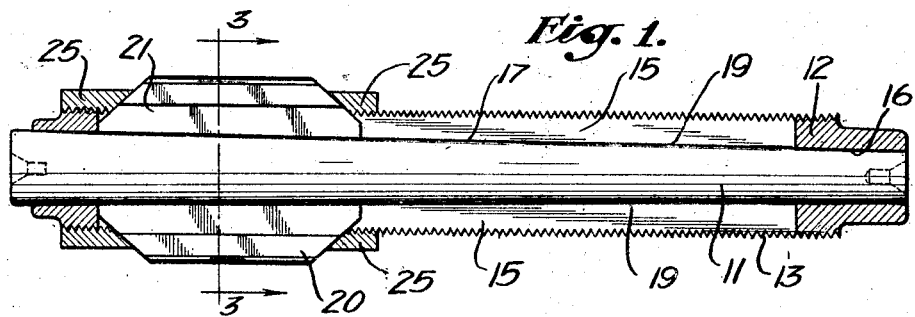
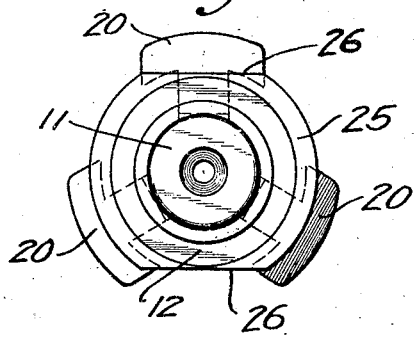 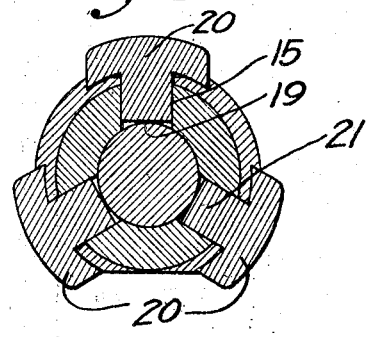
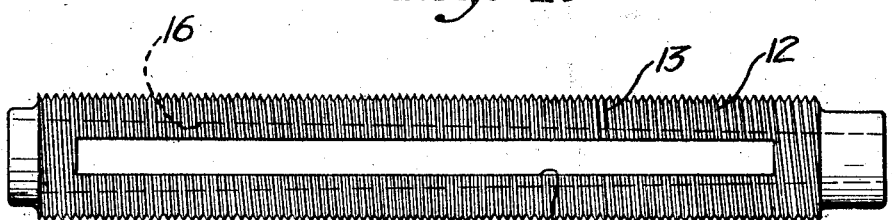
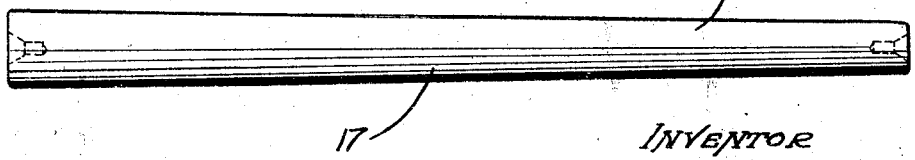
INVENTOR
HARRY S. WATERMAN
BY
Graham & Davis
ATTORNEYS Patented Mar. 3, 1925.

1,528,353

UNITED STATES PATENT OFFICE.

HARRY S. WATERMAN, OF LOS ANGELES, CALIFORNIA.

ADJUSTABLE MANDREL.

Application filed February 20, 1923. Serial No. 620,166.

*To all whom it may concern:*

Be it known that I, HARRY S. WATERMAN, a citizen of the United States, residing at Los Angeles, in the county of Los Angeles and State of California, have invented a new and useful Adjustable Mandrel, of which the following is a specification.

This invention relates to the construction of expanding arbors and adjustable reamers and taps.

In the present form of construction of articles of this character a shaft or mandrel is employed having channels cut therein with their bottoms converging towards one end of the mandrel. The blades or keys slide in these slots and owing to the sloping bottom may be spread apart or drawn together to assume various circumferential positions by movement along the channels. In the cutting of the channels considerable care must be exercised in order to preserve the correct slope thereof. These mandrels or shafts must necessarily be made of a steel which is soft enough to be machined, and it is impossible to harden them after machined owing to the distortion of the hardening process. It is recognized that the accuracy and life of such tools would be considerably increased would it be possible to harden the bottom of the grooves upon which considerable wear occurs.

My invention provides a means whereby a hardened bottom may be provided in the channels through which the blades or expansive members slide, and the invention further provides a much simpler and more economical construction which may be employed in the manufacture of expanding arbors and adjustable taps and reamers.

The especial advantages of my invention and further objects thereof will be made evident hereinafter.

Referring to the drawing which is for illustrative purposes only,

Fig. 1 is a sectional view through an expanding mandrel embodying the features of my invention.

Fig. 2 is an end elevation of the mandrel shown in Fig. 1.

Fig. 3 is a section taken substantially upon a plane represented by the line 3—3 of Fig. 1.

Fig. 4 is an elevational view of the sleeve employed in the construction of the mandrel.

Fig. 5 is an elevational view of the core member.

In the construction of the device shown in the drawing a tapered mandrel 11 as shown in Fig. 5 is machined and may be hardened and ground to size. A sleeve 12 as shown in Fig. 4 having threads 13 formed upon the outer face thereof is then machined up from machine steel or any other desirable material. This sleeve is provided with longitudinal slots 15 which extend inwardly from the outer face thereof and communicate with the tapered bore 16 thereof. The tapered bore 16 is matched with the tapered exterior face 17 of the arbor or core member 11 so that the sleeve 12 may be placed upon the arbor as shown in Fig. 1. When the arbor 11 is thus positioned within the sleeve portions of the outer face 17 thereof provide bottoms for the slots 15, thereupon converting them into channels having sloping or converging bottoms 19. In the channels thus formed slidable members constituting the blades of a reamer or tap may be placed as desired. In this illustration, however, the channels are fitted with expansive members 20 so that the device is thereupon equipped as an expanding mandrel. The blades 21 of the expansive members ride in the channels shown at 15 in Fig. 1 and rest upon the core member 11 which forms an accurately machined and ground surface.

Sleeves 25 are threaded upon the sleeve 12 as shown in Fig. 1 and are provided with flattened portions 26 for the engagement of a suitable wrench whereby they may be rotated upon the sleeve and thus moved therealong. It will be noticed that the circumferential portions assumed by the expansive members 20 is controlled entirely by the outer face of the core or arbor 11 along which the expansive members 20 slide as this member may be turned up in the form of a tapered arbor and accurately ground.

It will be seen that accuracy of the tool is obtained with a very small expenditure of labor and but little exercise of care as compared with the manufacture of the present form of mandrel having the slots milled therein. Furthermore, it is possible to harden the core 11 before it is ground thereupon providing a surface which will wear but very little when in use. This constitutes a decided advantage over the present form of construction owing to the fact that the distortion of a bar encountered in hardening operation results in inaccuracy of the channels in which the slidable members are carried, therefore preventing the hardening of these devices as they are at present constructed.

It is to be understood that the herein named mandrel may be of the circular cross section shown, or square or of other cross section.

I claim as my invention:

1. In an article of the class described, the combination of: a tapered mandrel; members adapted to slide longitudinally upon said mandrel; and means providing longitudinal channels exceeding said members in length and in which said members may slide longitudinally of said mandrel.

2. In an article of the class described, the combination of: a tapered core; expansive members adapted to slide longitudinally upon said core; and a sleeve fitting over said core, having slots therein exceeding said members in length and for guiding said members longitudinally of said mandrel.

3. In an article of the class described, the combination of: a tapered mandrel; expansive members adapted to slide longitudinally upon said mandrel; a sleeve fitting over said mandrel, having slots therein exceeding said members in length and for guiding said members longitudinally of said mandrel; and means for moving said members in said slots.

4. In an article of the class described, the combination of: a tapered mandrel; expansive members adapted to slide longitudinally upon said mandrel; a sleeve fitting over said mandrel, having slots therein exceeding said members in length and for guiding said members longitudinally of said mandrel; and means for moving said members simultaneously in said slots.

5. In an article of the class described, the combination of: a tapered mandrel; expansive members adapted to slide longitudinally upon said mandrel; a sleeve fitting over said mandrel, having slots therein exceeding said members in length and for guiding said members longitudinally of said mandrel, said sleeve having the outer face thereof threaded; and internally threaded sleeves screwed upon said slotted sleeves for engaging and moving said expansive members.

In testimony whereof, I have hereunto set my hand at Los Angeles, California, this 12th day of February, 1923.

HARRY S. WATERMAN.